(12) United States Patent
Sharron et al.

(10) Patent No.: US 10,377,069 B2
(45) Date of Patent: Aug. 13, 2019

(54) INJECTION MOLDED WINDOW AND METHOD

(71) Applicant: Dura Operating, LLC, Auburn Hills, MI (US)

(72) Inventors: Scott Sharron, Lasalle (CA); Christopher Stvartak, Waterford, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 232 days.

(21) Appl. No.: 15/221,238

(22) Filed: Jul. 27, 2016

(65) Prior Publication Data
US 2018/0029264 A1 Feb. 1, 2018

(51) Int. Cl.
| | |
|---|---|
| *B23B 1/00* | (2006.01) |
| *B29C 45/00* | (2006.01) |
| *B29C 45/14* | (2006.01) |
| *B29C 45/16* | (2006.01) |
| *B60J 1/00* | (2006.01) |
| *H05B 3/86* | (2006.01) |
| *B05D 3/06* | (2006.01) |
| *B29L 9/00* | (2006.01) |
| *B29L 31/34* | (2006.01) |

(Continued)

(52) U.S. Cl.
CPC ........ *B29C 45/14811* (2013.01); *B05D 3/067* (2013.01); *B29C 45/1671* (2013.01); *B29C 45/1679* (2013.01); *B60J 1/00* (2013.01); *H05B 3/86* (2013.01); *B29C 2035/0827* (2013.01); *B29C 2037/0035* (2013.01); *B29C 2037/0042* (2013.01); *B29C 2045/14696* (2013.01); *B29C 2045/563* (2013.01); *B29K 2033/04* (2013.01); *B29K 2033/12* (2013.01); *B29K 2069/00* (2013.01); *B29K 2075/00* (2013.01); *B29K 2083/00* (2013.01); *B29K 2995/0005* (2013.01); *B29K 2995/0026* (2013.01); *B29K 2995/0029* (2013.01); *B29K 2995/0087* (2013.01); *B29L 2009/005* (2013.01); *B29L 2031/3052* (2013.01); *B29L 2031/3456* (2013.01); *B32B 2605/006* (2013.01); *B60J 1/2094* (2013.01); *B60Y 2410/122* (2013.01); *H05B 2203/013* (2013.01)

(58) Field of Classification Search
CPC . B32B 27/308; B32B 27/365; B32B 2333/12; B32B 2369/00; B32B 2605/006; B32B 2250/04; B32B 2250/24; B60J 1/00; B29C 45/14811
See application file for complete search history.

(56) References Cited

U.S. PATENT DOCUMENTS 6,811,857 B1 * 11/2004 Bravet ............. B29C 45/14811
428/192
2004/0265512 A1 12/2004 Aengenheyster et al.
(Continued)

FOREIGN PATENT DOCUMENTS

WO 2006072177 A1 7/2006

*Primary Examiner* — Rip A Lee
(74) *Attorney, Agent, or Firm* — Robert E. Ford; Raymond J. Vivacqua; Steven L. Crane

(57) ABSTRACT

An injection molded part for a motor vehicle includes a film having a scratch-resistant layer, a plastic substrate molded to the film, wherein the plastic substrate is at least partially transparent or translucent, and a scratch-resistant coating molded to the plastic substrate on a side opposite the film.

10 Claims, 3 Drawing Sheets

(51) Int. Cl.
  *B29L 31/30*  (2006.01)
  *B29K 33/00*  (2006.01)
  *B29K 69/00*  (2006.01)
  *B29K 75/00*  (2006.01)
  *B29K 83/00*  (2006.01)
  *B60J 1/20*  (2006.01)
  *B29C 35/08*  (2006.01)
  *B29C 37/00*  (2006.01)
  *B29C 45/56*  (2006.01)
  *B29K 33/04*  (2006.01)

(56) References Cited

U.S. PATENT DOCUMENTS

| | | | | |
|---|---|---|---|---|
| 2008/0265459 A1* | 10/2008 | Gasworth | ............ | B29C 45/0053 |
| | | | | 264/255 |
| 2008/0272613 A1* | 11/2008 | Weiss | ................ | B29C 45/14336 |
| | | | | 296/146.1 |
| 2008/0274652 A1* | 11/2008 | Li | ...................... | B29C 45/14811 |
| | | | | 439/733.1 |
| 2013/0020007 A1* | 1/2013 | Niiyama | ........... | B32B 17/10018 |
| | | | | 156/60 |
| 2013/0280452 A1 | 10/2013 | Nawroth et al. | | |
| 2014/0199536 A1* | 7/2014 | Kappacher | ................ | B32B 1/00 |
| | | | | 428/220 |
| 2014/0356572 A1* | 12/2014 | Kim | ........................ | B32B 27/08 |
| | | | | 428/128 |
| 2017/0008377 A1* | 1/2017 | Fisher | ............... | B32B 17/10036 |
| 2017/0057205 A1* | 3/2017 | Notsu | ................ | B32B 17/10036 |
| 2017/0341970 A1* | 11/2017 | Ishida | ................... | C03B 25/025 |

\* cited by examiner

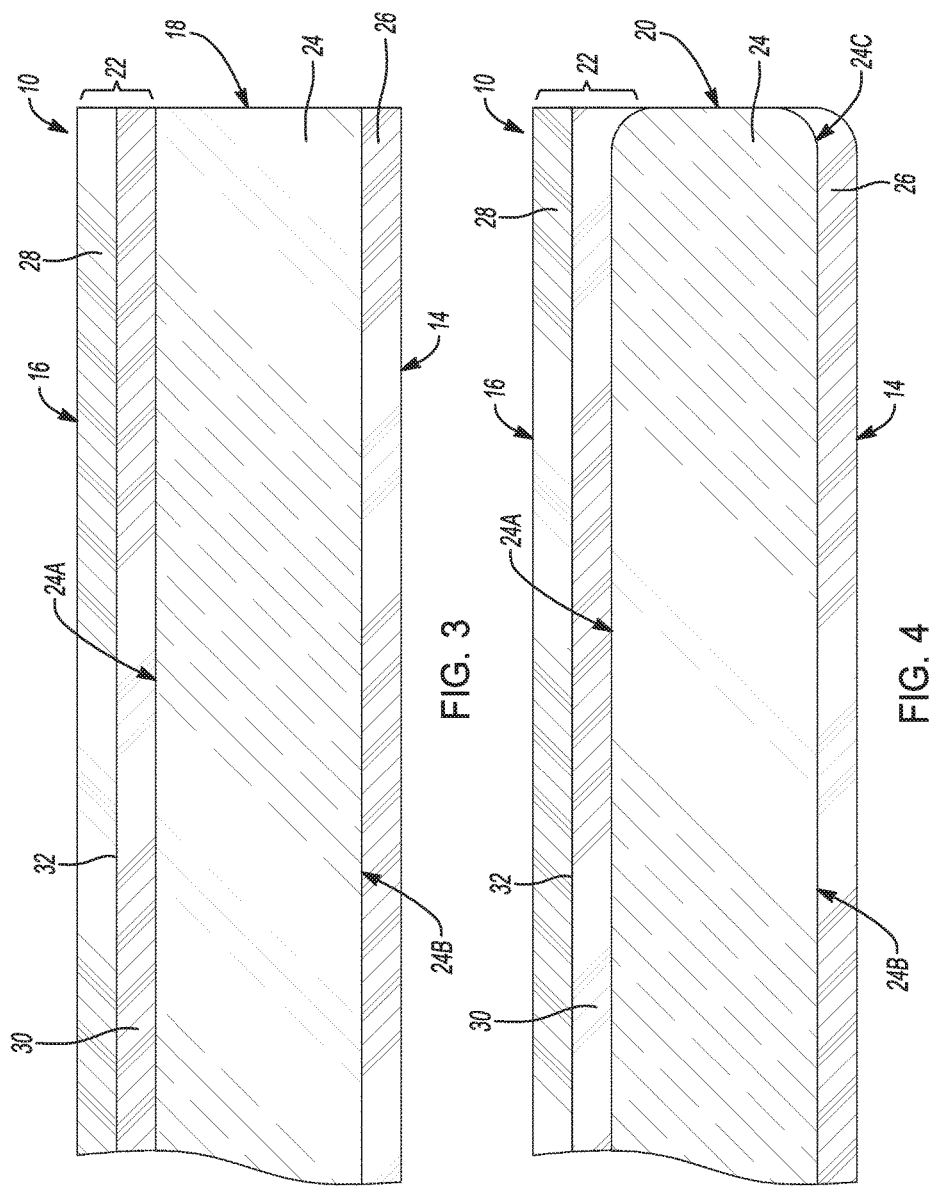

INJECTION MOLDED WINDOW AND METHOD

FIELD

The invention relates generally to an injection molded part and method for making the part for a motor vehicle, and more particularly to an injection molded window for a motor vehicle having a scratch resistant outer coating and a scratch resistant inner film and a method for making the injection molded window in a single mold.

BACKGROUND

The statements in this section merely provide background information related to the present disclosure and may or may not constitute prior art.

A typical motor vehicle has numerous injection molded parts, ranging from large body panels to decorative interior trim. These parts are formed by forcing or injecting a viscous material, such as a thermoplastic or thermosetting polymer, into a mold or cavity having the desired shape of the part. Thermoplastics are generally injected under elevated temperatures while thermosets are generally comprised of two different chemical components that crosslink and cure within the mold. The mold itself may take any number of shapes and forms and have multiple cavities.

Many of these parts include an exterior scratch-resistant coating to protect the part from damage during use. However, in parts used as windows where both the interior and exterior surfaces are exposed to the environment, both an exterior scratch-resistant coating and an interior scratch-resistant coating are needed to protect the part from damage. Typically, after the window part has solidified in the mold, the window is treated with two post-processes: first, a scratch-resistant polymer is sprayed onto each side of the window (or alternatively the window is dipped into a scratch-resistant polymer) and then, second, the scratch-resistant polymer is UV cured. While this process is useful for its intended purpose, the post-process treatments increase the cost of the part while providing a level of scratch resistance on the interior of the part that may be excessive. Thus, there is room in the art for a new window part and method of making that provides appropriate scratch resistance while minimizing post-processing.

SUMMARY

An injection molded part for a motor vehicle is provided. The injection molded part includes a film having a scratch-resistant layer, a plastic substrate molded to the film, wherein the plastic substrate is at least partially transparent or translucent, and a scratch-resistant coating molded to the plastic substrate on a side opposite the film.

In one aspect, the film includes a decorative layer disposed between the plastic substrate and the scratch-resistant layer.

In another aspect, the film includes a functional layer disposed between the plastic substrate and the scratch-resistant layer, wherein the functional layer includes electronic circuits, antennas, or heating elements embedded in a polymer.

In another aspect, the scratch-resistant layers are selected from the group consisting of siloxane, polymethyl methacrylate, polyurethane, and polyurea.

In another aspect, the plastic substrate is selected from the group consisting of polymethyl methacrylate and polycarbonate.

In another aspect, the scratch-resistant coating is polymethyl methacrylate mixed with reactive components in a liquid acrylate base that cures during the molding process to form a solid.

In another aspect, an adhesive is disposed between the film and the plastic substrate.

In another aspect, the part is a window for a motor vehicle.

In another aspect, the scratch-resistant film layer forms an exterior of the part and the scratch-resistant coating forms an interior of the part relative to the motor vehicle.

In another aspect, the plastic substrate includes a peripheral edge, and wherein the film and the scratch-resistant coating are disposed continuously on the plastic substrate up to the peripheral edge.

In another aspect, the plastic substrate includes an exterior surface, an interior surface, and a side surface, and wherein the side surface is substantially planar and extends from the interior surface to the exterior surface.

In another aspect, the film completely covers the interior surface and the scratch-resistant coating completely covers the exterior surface.

In another aspect, neither the film nor the scratch-resistant coating are disposed on the side surface.

In another aspect, an edge between the side surface and the exterior surface is rounded and the scratch-resistant coating is disposed on the rounded edge.

An injection molded window for a motor vehicle is also provided. The window includes a plastic substrate having an exterior surface and an interior surface relative to the motor vehicle, wherein the plastic substrate is at least partially transparent or translucent, a film having a scratch-resistant layer, the film disposed on the entirety of the interior surface of the plastic substrate, and an acrylic scratch-resistant coating disposed on the entirety of the exterior surface of the plastic substrate. The plastic substrate is molded to the film and the acrylic scratch-resistant coating is molded to the plastic substrate in a single mold.

A method for making a window for a motor vehicle is also provided. The method includes the steps of inserting a film having a scratch-resistant layer into a mold, injecting a polymer into the mold, wherein the polymer is at least partially transparent or translucent after cooling and solidifying, moving the mold to create a space, injecting a scratch-resistant acrylic into the space, and curing the scratch-resistant acrylic.

In one aspect, curing the scratch-resistant acrylic includes heat curing.

In another aspect, curing the scratch-resistant acrylic includes ultraviolet curing after the part is ejected from the injection mold.

In another aspect, the method includes compressing the scratch-resistant acrylic after injection into the space to completely cover a surface of the polymer.

In another aspect, the film includes one each of a decorative layer and a functional layer.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a cross-section view of the injection molded part viewed in the direction of arrows 3-3 in FIG. 2;

FIG. 4 is a cross-section view of the injection molded part viewed in the direction of arrows 4-4 in FIG. 2.

DETAILED DESCRIPTION

The following description is merely exemplary in nature and is not intended to limit the present disclosure, application, or uses.

Figure 1:
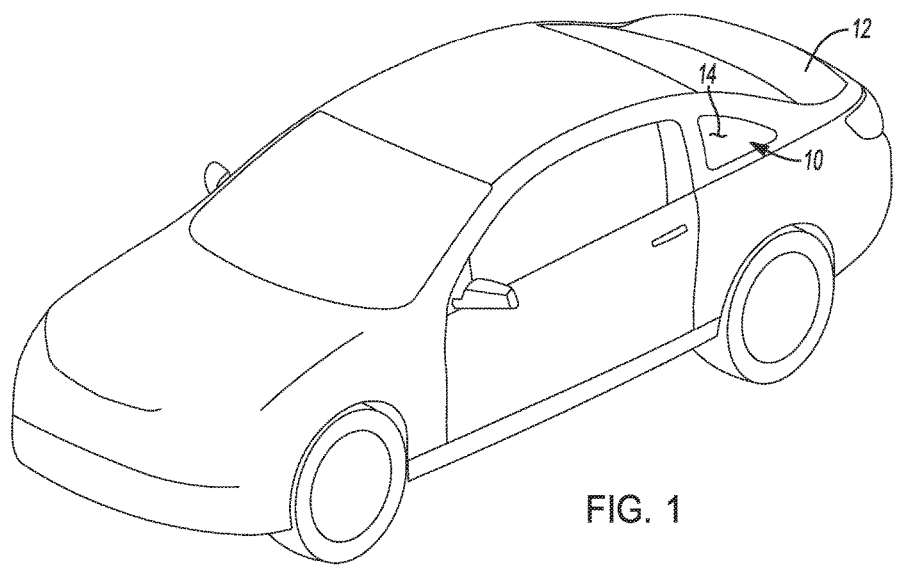
FIG. 1 is a front perspective view of an exemplary motor vehicle.
Figure 2:
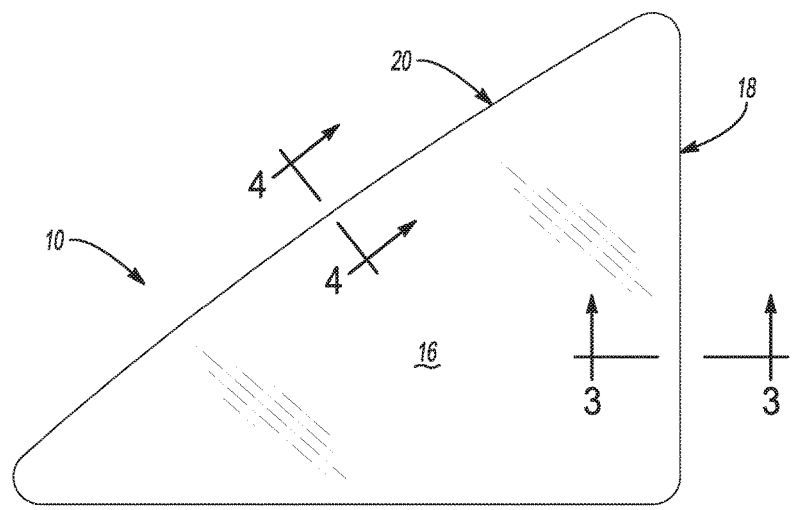
FIG. 2 is an exterior view of an example of an injection molded part of the motor vehicle.

With reference to FIGS. 1 and 2, an injection molded part according to the principles of the present invention is generally indicated by reference number 10. In the example provided, the injection molded part 10 is illustrated with an exemplary motor vehicle 12. In the example provided, the motor vehicle 12 is illustrated as a passenger vehicle. However, the motor vehicle 12 may be a truck, sport utility vehicle, van, motor home, or any other type of vehicle without departing from the scope of the present disclosure. Likewise, in the example provided, the injection molded part 10 is illustrated as a rear-quarter window. However, the injection molded part 10 may take various other shapes and forms where a non-glass, transparent part may be used, such as a front-quarter window, a sunroof or moonroof panel, a rear window, etc.

The injection molded part 10 generally includes an exterior side or surface 14, shown in FIG. 1, and an interior side or surface 16, shown in FIG. 2. The exterior side 14 is exterior relative to the motor vehicle 12 while the interior side 16 is interior relative to the motor vehicle 12. The injection molded part 10 may also include one or more flat side surfaces 18 and one or more rounded side surfaces 20. It should be appreciated that the number of flat side surfaces 18 and rounded side surfaces 20 may vary without departing from the scope of the present invention. For example, in applications where the injection molded part 10 is fixed, all the side surfaces may be flat. In applications where the injection molded part 10 is exposed, such as if the injection molded part 10 is lowered or opened, the exposed side surfaces are preferably rounded.

Turning to FIG. 3, the injection molded part 10 generally includes a film 22, a substrate 24, and a scratch-resistant coating 26. The film 22 is located on the interior side 16 of the injection molded part 10. The film 22 includes one or more layers of material including a scratch-resistant layer 28 and a decorative layer and/or a functional layer 30. The scratch-resistant layer 28 is disposed exterior to any other layers including the decorative/functional layer 30. The scratch-resistant layer 28 is selected from the group consisting of siloxane, polymethyl methacrylate, polyurethane, and polyurea. The decorative/functional layer 30 may include a printed film that may include graphics, shading, coloring, etc. In addition or alternatively, the decorative/functional layer 30 may include electronic circuits, antennae, or heating elements embedded in a transparent polymer. These functional elements may be connected to electronics in the motor vehicle 12.

The substrate 24 is a plastic that is at least partially transparent or translucent that can serve as a window for the motor vehicle 12. The plastic substrate 24 is selected from the group consisting of polymethyl methacrylate and polycarbonate. Generally, the substrate 24 may have any particular shape with an inner surface 24A and an outer surface 24B. The substrate 24 is molded to the film 22, as will be described below. An adhesive 32 may disposed between the film 22 and the plastic substrate 24 to promote adhesion there between.

The scratch-resistant coating 26 is disposed on the exterior surface 14 of the injection molded part 10. The scratch-resistant coating 26 is preferably polymethyl methacrylate mixed with reactive components in a liquid acrylate base that cures during the molding process to form a solid. The scratch-resistant coating 26 is more resistant to scratching and other damage than the scratch-resistant layer 28 of the film 22. The scratch-resistant coating 26 is molded to the substrate 24.

The film 22 preferably continuously covers the inner surface 24A of the substrate 24 while the scratch-resistant coating 26 preferably continuously covers the outer surface 24B of the substrate 24. However, as seen in FIG. 3, neither the film 22 nor the scratch-resistant coating 26 is disposed on the side flat side 18. As seen in FIG. 4, neither the film 22 nor the scratch-resistant coating 26 is disposed on the round side 20, however, the scratch-resistant coating 26 is disposed on a rounded portion 24C of the substrate 24 that is exposed during the molding process.

Figure 5:
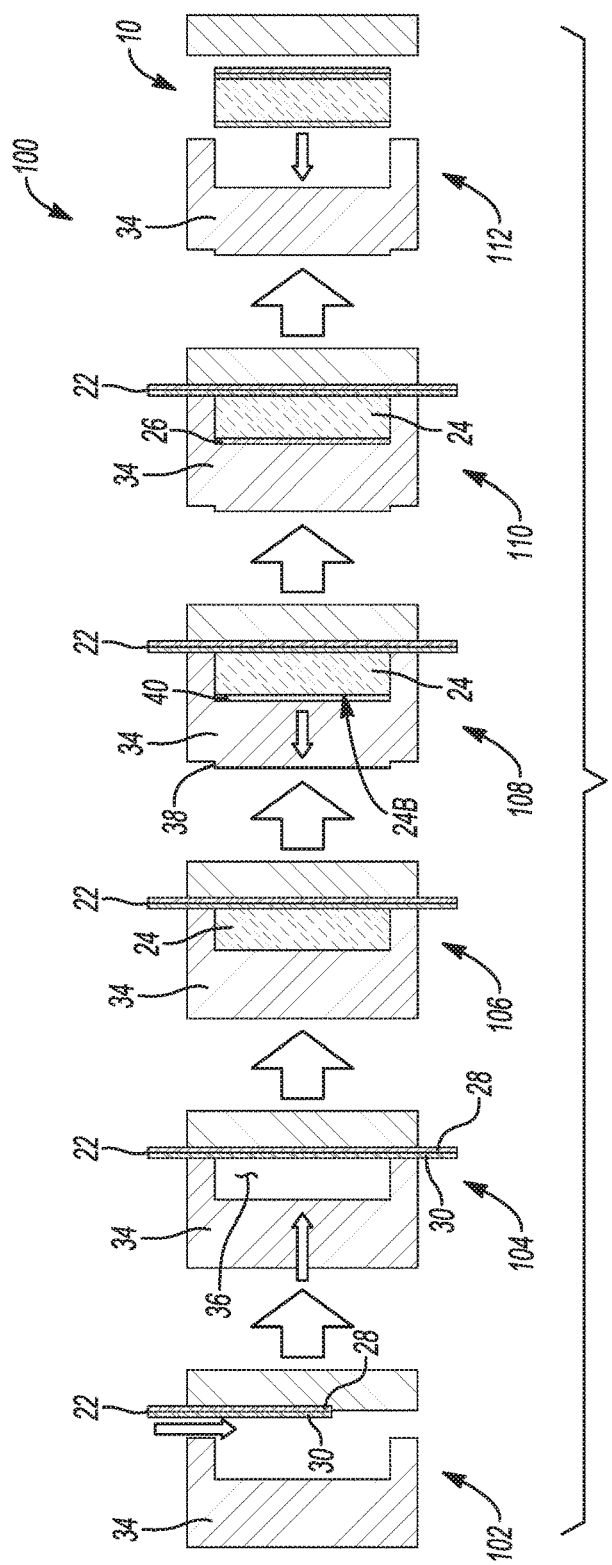
FIG. 5 is a schematic diagram of a method for making the injection molded part.

Turning now to FIG. 5, a method 100 for producing the injection molded part 10 is shown in a schematic diagram. The method begins at step 102 where a mold 34 is opened and the film 22 is inserted therein, as indicated by the arrow. The film 22 is oriented to have the scratch-resistant layer 28 face away from the mold cavity. Next, at step 104, the mold 34 is closed to form a first mold cavity 36 adjacent the decorative/functional layer 30. At step 106 the plastic substrate 24 is injected into the first mold cavity 36. The plastic substrate 24 is allowed to solidify in situ. At step 108 a portion 38 of the mold 34 is moved away from the substrate 24 to create a second mold cavity 40. The second mold cavity 40 is disposed adjacent the outer surface 24B of the substrate 24. At step 110 the scratch-resistant coating 26 is injected into the second mold cavity 40. Alternatively, opening of the mold portion 38 may suck the scratch-resistant coating 26 into the second mold cavity 40 and the mold portion 38 may be closed to spread out the scratch-resistant coating 26 onto the substrate 24. The scratch-resistant coating 26 may be heat cured in situ. Finally, at step 112, the mold 34 is opened and the injection molded part 10 is removed for any further post-processing. The scratch-resistant coating 26 may be UV cured during or after this step.

The description of the invention is merely exemplary in nature and variations that do not depart from the gist of the invention are intended to be within the scope of the invention. Such variations are not to be regarded as a departure from the spirit and scope of the invention.

The following is claimed:

1. An injection molded part for a motor vehicle comprising:
   a film having a scratch-resistant layer;
   a plastic substrate injection molded to the film, wherein the plastic substrate is at least partially transparent or translucent and includes an exterior surface, an interior surface, and a side surface, and wherein the side surface includes a rounded portion; and
   a scratch-resistant coating injection molded to the plastic substrate on a side opposite the film,
   wherein the film completely covers the interior surface and the scratch-resistant coating completely covers the exterior surface and the scratch-resistant coating is disposed on the rounded portion.

2. The injection molded part of claim 1 wherein the film includes a decorative layer disposed between the plastic substrate and the scratch-resistant layer.

3. The injection molded part of claim 1 wherein the film includes a functional layer disposed between the plastic substrate and the scratch-resistant layer, wherein the functional layer includes electronic circuits, antennae, or heating elements embedded in a polymer.

4. The injection molded part of claim 1 wherein the scratch-resistant layer is selected from the group consisting of polysiloxone, polymethyl methacrylate, polyurethane, and polyurea.

5. The injection molded part of claim 1 wherein the plastic substrate is selected from the group consisting of polymethyl methacrylate and polycarbonate.

6. The injection molded part of claim 1 wherein the scratch-resistant coating is polymethyl methacrylate mixed with reactive components in a liquid acrylate base that cures during the injection molding to form a solid.

7. The injection molded part of claim 1 further comprising an adhesive disposed between the film and the plastic substrate.

8. The injection molded part of claim 1 wherein the part is a window for a motor vehicle.

9. The injection molded part of claim 8 wherein the scratch-resistant film layer forms an interior of the part and the scratch-resistant coating forms an exterior of the part relative to the motor vehicle.

10. The injection molded part of claim 1 wherein the plastic substrate includes a peripheral edge, and wherein the film and the scratch-resistant coating are disposed continuously on the plastic substrate up to the peripheral edge.

* * * * *